United States Patent [19]
Beullens

[11] Patent Number: 4,841,845
[45] Date of Patent: Jun. 27, 1989

[54] HYDRAULIC OR PNEUMATIC DRIVE DEVICE

[76] Inventor: Théophile Beullens, Middelweg 213, 3030 Heverlee, Belgium

[21] Appl. No.: 99,007

[22] Filed: Sep. 21, 1987

[30] Foreign Application Priority Data

Sep. 22, 1986 [BE] Belgium ........................ PV0/217.191

[51] Int. Cl.[4] ............................ F01B 19/00; F16J 3/00
[52] U.S. Cl. ............................................ 92/92; 92/90; 92/103 F
[58] Field of Search .................... 92/92, 91, 90, 89, 48, 92/103 F, 103 SD

[56] References Cited

U.S. PATENT DOCUMENTS

| | | | |
|---|---|---|---|
| 1,025,986 | 5/1912 | Lester | 92/92 |
| 2,328,970 | 9/1943 | Farquhar | 92/92 |
| 2,483,088 | 9/1946 | Haven | 92/92 |
| 2,532,143 | 11/1950 | Breit | 92/92 |
| 2,584,431 | 2/1952 | Dearsley | 92/90 |
| 2,642,091 | 6/1953 | Morin | 92/90 |
| 2,789,580 | 4/1957 | Woods | 92/90 |
| 2,844,126 | 7/1958 | Gaylord | 92/90 |
| 3,481,254 | 12/1969 | Wetherbee, Jr. | 92/92 |
| 3,561,330 | 2/1971 | Rich | 92/92 |
| 3,579,412 | 5/1971 | Paine | 92/92 |
| 3,645,173 | 2/1972 | Yarlott | 92/92 |
| 4,615,260 | 10/1986 | Takagi et al. | 92/92 |
| 4,664,232 | 5/1987 | Takagi et al. | 92/90 |

FOREIGN PATENT DOCUMENTS

| | | | |
|---|---|---|---|
| 0509387 | 1/1947 | Canada | 92/90 |
| 0225834 | 2/1963 | Fed. Rep. of Germany | 92/90 |
| 2701843 | 7/1978 | Fed. Rep. of Germany | 92/90 |
| 0613511 | 12/1960 | Italy | 92/90 |
| 5881205 | 11/1981 | Japan | 92/90 |
| 1216321 | 12/1960 | United Kingdom | 92/89 |

*Primary Examiner*—Robert E. Garrett
*Assistant Examiner*—Thomas Denion
*Attorney, Agent, or Firm*—Cushman, Darby & Cushman

[57] ABSTRACT

The device comprises on the one hand at least one substantially tightly-sealable chamber, which is bounded partly at least by a wall from an approximately resiliently distortable material, and on the other hand flexible, approximately unstretchable spiral-wound filaments which extend substantially next to one another at least about said wall, whereby part of said filaments are wound rightwards and another part thereof leftwards, and this in such a way that two arbitrary crossing filaments may undergo some angular displacement relative to one another, and the one end each said filaments on the one side of said chamber is fixed relative to a working point, and the other end thereof on the opposite side of said chamber is fixed relative to another working point, and whereby further at least one feed opening is provided in said chamber, wherethrough a pressurized gas or liquid may be fed and said wall is distortable at least along one direction cross-wise to the line joining both said working points, in such a way that by regulating the gas or liquid pressure inside the chamber, a relative displacement of said working points occurs.

17 Claims, 4 Drawing Sheets

HYDRAULIC OR PNEUMATIC DRIVE DEVICE

The invention relates to a hydraulic or pneumatic drive device which is suitable for the most varied applications in all kinds of areas.

The existing drive devices, which are controlled hydraulically or pneumatically, generally are of the cylinder-piston type or the pressure chamber-diaphragm type.

The first type of devices are generally expensive to buy and have an intricate structure, whereby they are generally sensitive to faults, while the latter type of devices can only perform relatively small displacements, in such a way that the applicability thereof is also limited.

For some applications, it is for example enough to obtain a pulling force without the complexity of a double-action cylinder-piston mechanism or of a linkage with the known diaphragm converters.

The invention has for object on the one hand notably to obviate said various drawbacks from the above known drive devices, and on the other hand to provide a drive device which allows in a very simple and efficient way, to perform all kinds of composite movements with an absolute accuracy.

For this purpose, the drive device according to the invention comprises on the one hand at least one substantially tightly-sealable chamber, which is bounded partly at least by a wall from an approximately resiliently distortable material, and on the other hand flexible, approximately unstretchable spiral-wound filaments which extend substantially next to one another at least about said wall, whereby part of said filaments are wound rightwards and another part thereof leftwards, and this in such a way that two arbitrary crossing filaments may undergo some angular displacement relative to one another, and the one end each said filaments on the one side of said chamber is fixed relative to a working point, and the other end thereof on the opposite side of said chamber is fixed relative to another working point, and whereby further at least one feed opening is provided in said chamber, wherethrough a pressurized gas or liquid may be fed and said wall is distortable at least along one direction cross-wise to the line joining both said working points, in such a way that by regulating the gas or liquid pressure inside the chamber, a relative displacement of said working points occurs.

Usefully, substantially as many filaments are wound rightwards as leftwards about said resiliently-distortable wall.

According to a particular embodiment of the invention, the chamber is substantially in the shape of a revolution body, the revolution surface of which is formed by the flexible resiliently-distortable wall, whereby the working points lie on either side of said body, approximately on the axis thereof, and said filaments are wound spiral-like along the body axial direction, about said body.

Other details and advantages of the invention will stand out from the following description, given by way of non limitative example and with reference to the accompanying drawings, in which.

In the various figures, the same reference numerals pertain to the same or similar elements.

Figure 1:
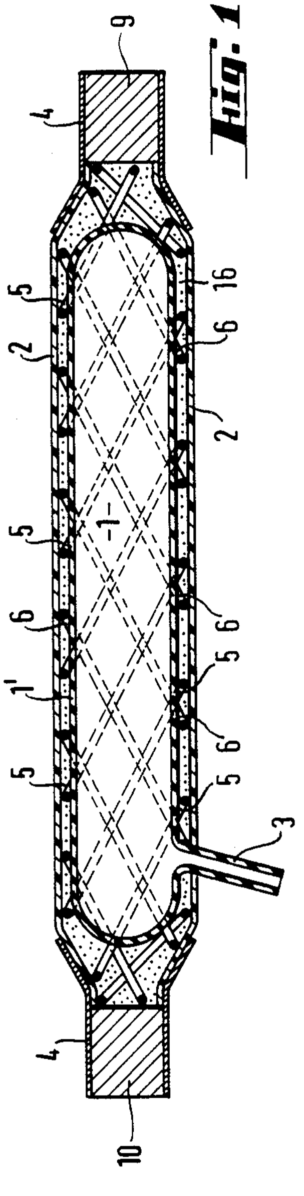
FIG. 1 is a diagrammatic lengthwise section in inactive position, of a drive device in a first embodiment of the invention.

The invention generally relates to a hydraulic or pneumatic drive device which is essentially comprised of a hermetically-sealable chamber 1, which is bounded by a wall 1' from substantially resiliently distortable material, and of flexible, substantially unstretchable spiral-wound filaments 5 and 6, such as steel wires, which extend substantially next to one another in the form of a casing about and contacting said wall 1'.

One portion 5 from said filaments are wound leftwards, while the other portion 6 thereof are wound rightwards, and this with a suitable play in such a way that two arbitrary crossing filaments 5 and 6 can undergo some angular relative displacement relative to one another.

The one end of each filament 5 and 6 on the one side of chamber 1, is fixed relative to a working point 9, while the other end thereof on the opposite side of said wall 1, is fixed relative to another working point 10.

There is further provided in said chamber 1, an opening whereon a preferably flexible feed pipe 3 is connected and wherethrough a pressurized gas or liquid can be fed to chamber 1.

The wall 1' from chamber 1 is distortable at least along one direction cross-wise to the line joining the working points 9 and 10, in such a way that by regulating the gas or liquid pressure inside chamber 1, a relative displacement of said working points occurs.

There are preferably substantially as many rightward-wound filaments 6 as leftward-wound filaments 5 about wall 1', and said filaments are interlaced together in strands or bundles to form a continuous interlacement which is loose relative to wall 1, always insuring that said angular displacement remains possible.

For clearness sake, particularly in FIG. 1, but a limited number filaments have been shown in the figures with a regular spacing over the wall 1' from chamber 1. It is however clear that said filaments are actually arranged with such a spacing from one another, somewhat dependent on the kind of wall 1', that when pressurized liquid or gas is fed to chamber 1, said wall does not press between the windings of filaments 5 and 6. This is also the actual meaning which is to be given to the above wording "substantially next to one another in the form of a continuous casing . . . ".

Figure 2:
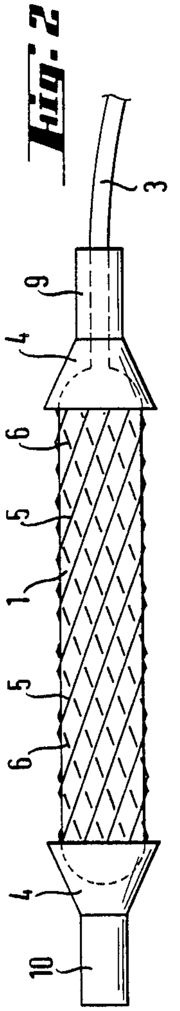
FIG. 2 is a diagrammatic side view, also in inactive position, of a second embodiment of the drive device according to the invention.
Figure 3:
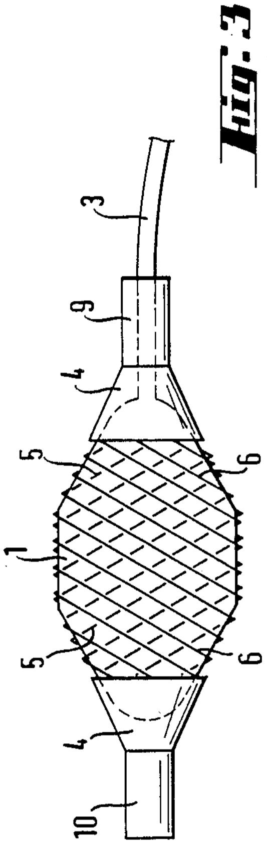
FIG. 3 is a similar diagrammatic side view, in active position, of the second embodiment.

As it is clearly shown in FIGS. 2 and 3, the working points 9 and 10 are movable relative to one another between two end positions: an inactive position as shown in FIG. 2, and a terminal active position as shown in FIG. 3.

In the inactive position, the gas or liquid pressure inside chamber 1 is minimum and the slope angle of the spiral-wound filaments 5 and 6 is preferably larger than 36°, more particularly between 50° and 80°, while in the terminal active position, said angle is approximately about 36°.

The reasons for such prefered angles will stand out from a more detailed description of the device operation.

Figure 4:
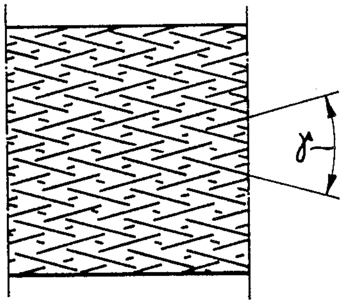
FIG. 4 shows on a larger scale, a cut-out portion from said second embodiment in inactive position.
Figure 5:
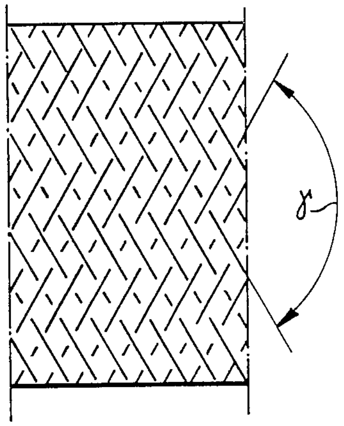
FIG. 5 shows on a larger scale, said same cut-out portion from said second embodiment in active position.

In FIGS. 4 and 5 which show on a larger scale part of the continuous interlacement formed by the filaments, said angular displacement $\gamma$ which the leftward-wound and rightward-wound filaments 5 and 6 undergo relative to one another, is shown between the inactive position and terminal active position.

To obtain a symmetrical expansion of chamber 1 under the action of the gas or liquid pressure, said chamber preferably has for most applications being considered, the shape of a revolution body the revolution surface of which is formed by the flexible resiliently-distortable wall 1', with the working points 9 and 10 lying on the revolution axis thereof on either side of said body, and the filaments 5 and 6 are wound spiral-like along said axis thereabout.

A particular preference is mostly given to a cylinder-shaped revolution body, as shown in the figures.

Figure 7:
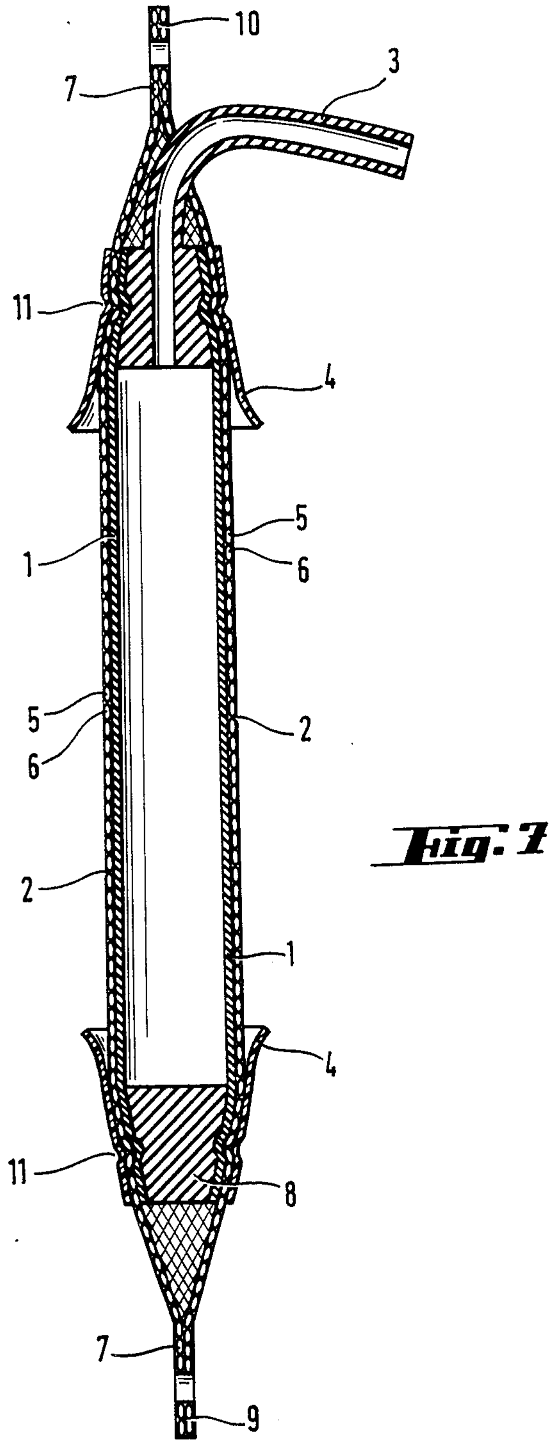
FIG. 7 is a diagrammatic lengthwise section in inactive position, of a fourth embodiment of the drive device according to the invention.

In the embodiment as shown in FIG. 7, the wall 1' is comprised of a cylinder-like tube from flexible, resilient material, both ends of which are closed by a plug 8.

In the one said plugs 8, an opening is provided the feed pipe 3 connects to.

In all the embodiments as shown in the figures, on each side of chamber 1 where said working points 9 and 10 are provided for, between said chamber and the adjacent working point, a rigid transition piece 4 is provided, which is comprised of a truncated cone-shaped sleeve which is slipped over the spiral-wound filaments.

More particularly in the embodiment as shown in FIG. 7, said transition piece 4 clamps the wall 1' as well as the filaments 5 and 6 on the plugs 8. Moreover, to insure the tightness, the transition piece has an inward-facing ring-like indentation 11 which engages a similar indentation in the plugs 8.

Figure 6:
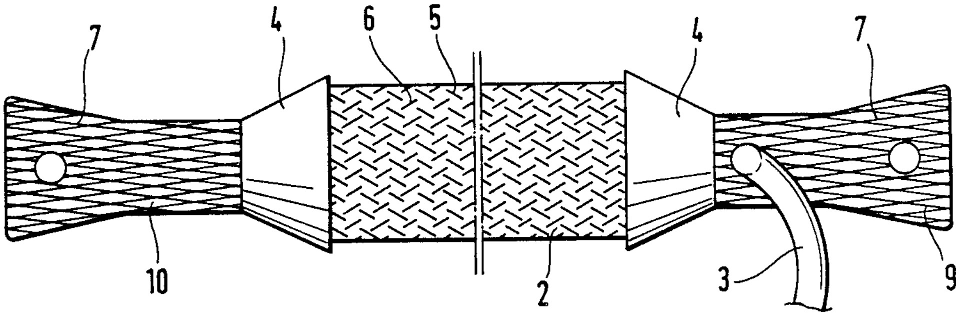
FIG. 6 is a diagrammatic side view, partly in section, of a third embodiment in inactive position, of the drive device according to the invention.

In the embodiments as shown in FIGS. 6 and 7, the free ends of the spiral-wound filaments are twisted together in bundles, in the shape of a flattened cable, and thus form said working points 9 and 10, wherein a fastening is for example provided.

Further in connection with the embodiment as shown in FIG. 1, same is provided with a double wall which is formed on the one hand by the above-described wall 1', and on the other hand by an outer casing 2 also from a flexible, resiliently-distortable material, wherebetween said filaments 5 and 6 are arranged together with a lubricant 16, such as talc or graphite, which allows to dramatically minimize the mutual friction between filaments 5 and 6, and serves simultaneously as protection for wall 1'.

A distortable material layer may possibly be provided together with or instead of a lubricant, between the rightward-wound and leftward-wound filaments.

It is of importance to note that when going from the inactive to the active position, theoretically no friction occurs as well between the filaments 5 and 6, as between said filaments and wall 1'. Indeed said rightward-wound and leftward-wound filaments only undergo, by a change of the crossing angle $\gamma$ thereof, a rotation relative to one another and simply follow the movements of wall 1'. There also results therefrom that the filaments 5 and 6 may be connected together in that location where they cross one another, in such a way that the whole filament unit may rather be considered as a netting. There further results therefrom that said filaments may be embedded in wall 1'.

When as it is mostly the case, but a translating is to be performed between the working points, the slope angles of the leftward-wound and rightward-wound filaments are preferably the same.

When however for some applications, an helix-like movement is desired, it is then only required for these slope angles to be different from one another.

The operation of the drive device according to the invention will now further be explained hereinafter with reference to FIGS. 2 to 5.

When an overpressure prevails inside chamber 1, the spiral filaments 5 and 6 will lie in the most-extended condition, in other words the number windings per length unit will be lowest. In such a case, the crossing angle $\gamma$ between the leftward-wound and rightward-wound filaments will be as small as possible (see FIG. 4).

The spacing between the working points 9 and 10 is thereby the widest and the device lies in inactive position.

By increasing the pressure inside chamber 1, the wall 1' will expand and a force will be exerted on said filaments 5 and 6. Said force is absorbed by said latter filaments and conveyed partly along the windings thereof to the ends thereof and thus to said working points 9 and 10.

Due to expansion of wall 1', the winding diameter of filaments 5 and 6 increases and as said latter filaments are substantially unstretchable, the working points 9 and 10 are pulled towards one another.

The force being generated on the working points 9 and 10 is largest when said crossing angle $\gamma$ is smallest and decreases as said angle increases. The operation goes on until the crossing angle $\gamma$ between the spiral filaments has reached about 108°. At this moment, the pulling force between the working points becomes zero and the diameter of the expanded cylinder-like wall 1' the largest. The drive device then lies in said terminal active position. It has been determined that in such position, the spacing reduction between the working points 9 and 10 for a 108° crossing angle is brought down to 40% of the original spacing between said working points, that is in said inactive position.

Considering that the length of one winding from a spiral filament is equal to K, it then appears that the force being exerted on the working points fulfills the formula: $F=P.(1-3\sin^2\alpha).K^2/4.\pi$, where P is the pressure inside the chamber 1 and $\alpha$ is the slope angle of the spiral filaments.

As $K^2/4.\pi$ is constant and equal to a circular surface area with K as circumference, it appears from said formula that the generated force F is dependent on the pressure P being applied and on the spiral slope angle $\alpha$.

When for example said slope angle nears 90°, that is when the spacing between the working points is widest, then the force is $F=-2.P.K.^2/4.\pi$, which is thus a pulling force.

When for example $\alpha=36°$ ($\sin \alpha=\sqrt{3}/3$), then the force F being generated appears to be zero.

The slope angle valid for a spiral may be substituted in the formula with the crossing angle $\alpha=(180°-2\alpha)$, in such a way that the formula becomes: $F=P.(1-3 \cos^2 \gamma/2).K^2/4.\pi$.

Figure 8:
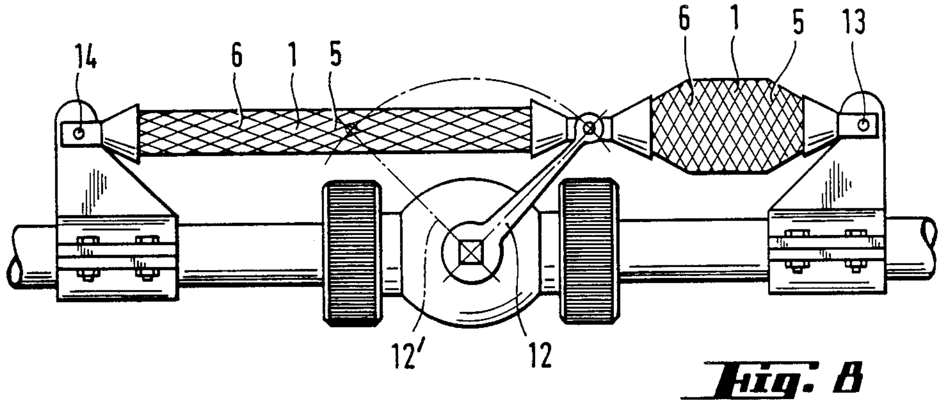
FIG. 8 is a diagrammatic showing of a first particular application of the drive device according to the invention.
Figure 9:
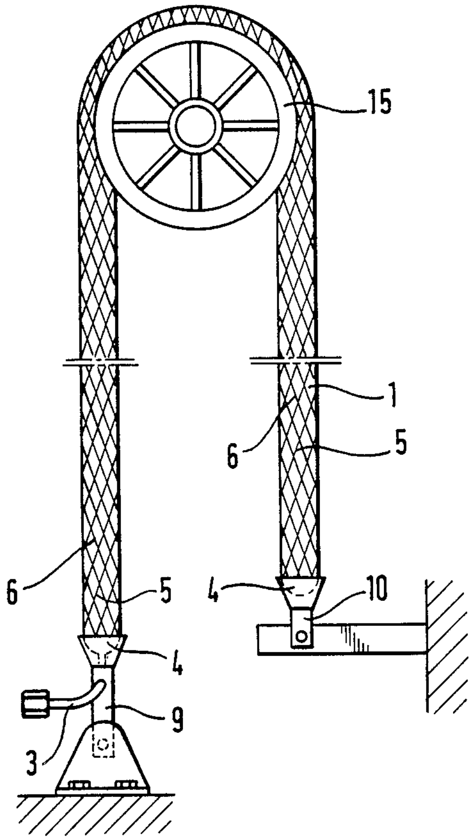
FIG. 9 is a diagrammatic showing of a second particular embodiment of the drive device according to the invention.

Finally, two particular application examples of the drive device according to the invention have been shown in FIGS. 8 and 9.

FIG. 8 relates to a valve which can be controlled completely automatically by means of two drive devices according to the invention arranged in the extension of one another, by regulating the pressure inside the chambers 1 from both devices lying in the extension of one another. Said latter devices are hingedly mounted in the working points thereof, to one another and relative to the valve, in such a way that the operating arm 12 thereof can perform an angular displacement between two end positions as shown by dot-and-dash line 12'. Both drive devices undergo thereby some rotation about the fixed fastening points 13 and 14 thereof.

FIG. 9 shows an apparatus which is for example usable as hoisting device, automatic door opener, etc. . . . By providing a pressure through pipe 3, the hose-like chamber 1 bulges and undergoes a shortening about 40%, whereby the movable working point 10 undergoes an upwards displacement together with a rotation of the pulley wheel 15.

The invention is naturally in no way limited to the above-described embodiments, and many changes might be brought thereto within the scope of the invention, notably as regards the shape and size of the pertaining drive device, as well as the use thereof.

For instance, said device may advantageously be used in the robot domain, for building all kinds of prostheses, such as artificial limbs.

What is claimed is:

1. A fluid drive device comprising:

a wall of a substantially resiliently distortable material forming a substantially tightly sealable chamber in the shape of a body of revolution the surface of which is defined by said wall;

flexible substantially unstretchable spiral-wound filaments extending substantially next to one another about said wall and the axis of said chamber, part of said filaments being wound rightward and another part leftward in such a way that two arbitrary crossing filaments may undergo some angular displacement relative to one another, one end of each of said filaments being fixed relative to a working point at one end of said axis and the other end of each of said filaments being fixed relative to another working point at the other end of said axis;

means defining a feed opening for said chamber through which a pressurized fluid may be introduced thereinto, said wall being distortable at least along one direction transverse to said axis in such a way that by regulating the fluid pressure in said chamber a relative displacement of said working points occurs; and a truncated cone-shaped transition piece on each end of said body extending over said filaments.

2. The device defined in claim 1 wherein each end of the chamber is closed by a plug and the transition piece clamps the filaments, together with the underlying wall, on the plug.

3. The device defined in claim 1 in which the filaments are connected together at their crossing points in such a way that they form a netting.

4. The device defined in claim 1 in which the filaments are embedded in the wall.

5. Drive device as defined in claim 1, in which substantially as many rightward- as leftward-wound filaments are wound about said resiliently-distortable wall.

6. Drive device as defined in claim 1, in which the leftward-wound and rightward-wound filaments are interlaced together, in such a way however that said angular displacement remains possible.

7. Drive device as defined in claim 6, in which the filaments are interlaced in the form of strands or bundles.

8. Drive device as defined in claim 1, in which the spiral-wound filaments form a substantially continuous netting about said resiliently-distortable wall of the tightly-sealable chamber.

9. Drive device as defined in claim 1, in which the spiral-wound filaments extend loosely from said resiliently-distortable wall.

10. Drive device as defined in claim 1, in which said working points are movable relative to one another between two end positions, an inactive position and a terminal active position, whereby in the inactive position the fluid pressure inside the chamber is minimum, and the slope angle of the spiral-wound filaments is larger than 36°, preferably between 50° and 80°, and in the terminal active position, said angle is substantially about 36°.

11. Drive device as defined in claim 1, in which both ends of said revolution body are each closed by a plug, and said opening for feeding pressurized fluid is provided in at least one of said plugs.

12. Drive device as defined in claim 1, in which the revolution body is substantially cylinder-shaped.

13. Drive device as defined in claim 1, in which the free ends of said spiral-wound filament are twisted together in bundles, in the shape of a cable, and are fixed relative to the working points.

14. Drive device as defined in claim 1, in which the filaments are enclosed in a resiliently distortable casing and a lubricant is provided between the wall and the casing to facilitate the relative displacement of said filaments.

15. Drive device as defined in claim 1, in which the slope angles of the leftward-wound and rightward-wound filaments are substantially the same.

16. Drive device as defined in claim 1, in which the slope angle of the leftward-wound filaments is different from that of the rightward-wound filaments.

17. Drive device as defined in claim 1, in which a layer of distortable material is provided between the leftward- and rightward-wound filaments.

* * * * *